United States Patent
Younsi et al.

(10) Patent No.: US 6,750,400 B2
(45) Date of Patent: Jun. 15, 2004

(54) GRADED ELECTRIC FIELD INSULATION SYSTEM FOR DYNAMOELECTRIC MACHINE

(75) Inventors: A. Karim Younsi, Peterborough (CA); David A. Snopek, Peterborough (CA); Robert Draper, Peterborough (CA); Konrad Weeber, Rexford, NY (US)

(73) Assignee: General Electric Canada Inc., Mississauga (CA)

( * ) Notice: Subject to any disclaimer, the term of this patent is extended or adjusted under 35 U.S.C. 154(b) by 163 days.

(21) Appl. No.: 09/942,544

(22) Filed: Aug. 31, 2001

(65) Prior Publication Data

US 2002/0029897 A1 Mar. 14, 2002

(30) Foreign Application Priority Data

Sep. 14, 2000 (CA) ............................... 2319281
May 3, 2001 (CA) ............................... 2344564

(51) Int. Cl.$^7$ ............................... H01B 7/00
(52) U.S. Cl. ............................... 174/110 R; 174/120 R; 174/126.1; 174/126.7
(58) Field of Search ............................... 174/110 R, 110 D, 174/117 F, 117 FF, 117 A, 119 R, 120 R, 120 C, 121 R, 122 R, 122 G, 122 C, 124 R, 124 G, 124 GC, 126.1, 127, 128.1, 128.2, 129 R, 129 B

(56) References Cited

U.S. PATENT DOCUMENTS

| | | | | |
|---|---|---|---|---|
| 3,860,744 A | * | 1/1975 | Schuler ............... | 174/117 FF |
| 4,001,616 A | | 1/1977 | Lonseth et al. ......... | 310/45 |
| 4,112,183 A | * | 9/1978 | Smith .................. | 428/363 |
| 4,207,482 A | | 6/1980 | Neumeyer et al. ....... | 310/45 |
| 4,254,351 A | * | 3/1981 | Smith et al. .......... | 310/45 |
| 4,335,367 A | * | 6/1982 | Mitsui et al. ......... | 336/205 |
| 4,356,417 A | | 10/1982 | Smith et al. .......... | 310/43 |
| 4,473,765 A | | 9/1984 | Butman, Jr. et al. .... | 310/215 |
| 4,576,856 A | * | 3/1986 | Kuwajima et al. ....... | 442/296 |
| 4,634,911 A | | 1/1987 | Studniarz et al. ...... | 310/215 |
| 4,704,322 A | * | 11/1987 | Roberts ............... | 442/28 |
| 4,723,083 A | * | 2/1988 | Elton ................. | 310/45 |
| 4,724,345 A | * | 2/1988 | Elton et al. .......... | 310/45 |
| 4,724,600 A | | 2/1988 | Studniarz et al. ...... | 29/596 |
| 4,948,758 A | * | 8/1990 | Beall et al. .......... | 501/3 |
| 5,099,159 A | * | 3/1992 | Liptak et al. ......... | 310/45 |
| 5,115,556 A | * | 5/1992 | Gavrilidis et al. ..... | 29/596 |
| 5,416,373 A | * | 5/1995 | Maruyama et al. ....... | 310/208 |
| 5,623,174 A | | 4/1997 | Markovitz et al. ...... | 310/45 |
| 5,674,340 A | * | 10/1997 | Swiatkowski et al. .... | 156/184 |
| 5,801,334 A | * | 9/1998 | Theodorides .......... | 174/120 SR |
| 5,973,269 A | | 10/1999 | Draper et al. ......... | 174/120 R |

FOREIGN PATENT DOCUMENTS

| | | | | |
|---|---|---|---|---|
| CH | 669 277 A5 | | 2/1989 | ............ H01B/9/02 |
| DE | 198 11 370 A1 | | 9/1999 | ............ H02K/3/30 |
| GB | 2 165 689 A | * | 4/1986 | ............ H01B/9/02 |
| WO | WO 99/17425 | | 4/1999 | ............ H02K/3/40 |

* cited by examiner

*Primary Examiner*—William H Mayo, III

(57) ABSTRACT

A groundwall insulation system for use in dynamoelectric machines carrying voltage above 4 kV, and preferably in the order of 13.8 kV, or higher has two layers of insulation wound onto the conductors of the high voltage winding. The first layer of insulation has a first permittivity that is greater then the permittivity of the second layer of insulation wound onto the first layer of insulation. As a consequence, at the juncture between the first and second layers there is a sharp increase in the electric field profile as seen through the groundwall insulation.

15 Claims, 4 Drawing Sheets

GRADED ELECTRIC FIELD INSULATION SYSTEM FOR DYNAMOELECTRIC MACHINE

FIELD OF THE INVENTION

The present invention relates to an insulation system for use in windings of a dynamoelectric machine. In particular it relates to an insulation comprising inner and outer layers having differing permittivities to create a more advantageous stress distribution within the dielectric.

BACKGROUND OF THE INVENTION

Insulation systems for large AC dynamoelectric machines are under constant development to increase the voltages at which these machines operate while at the same time minimizing the thickness of the insulating material.

In such insulation systems it is common to utilize mica in a variety of forms from large flake dispersed on a backing material, to the product known as mica paper. While the low tensile strength of mica paper does not lend itself to use in such insulation systems, mica paper has superior corona breakdown resistance countering the coronal discharge occurring in high voltage windings that tends to shorten the life of the insulation. To compensate for the low tensile strength of the mica paper, the mica paper is bonded to glass fibers which also tends to prevent the shedding of mica flakes from the mica tape during a taping operation.

More recently a corona resistant polyimide and composite insulation tape has been employed in the insulation systems. This tape has exceptional insulation qualities and good corona discharge resistance. This film may be used independently or as a backing on a mica paper, glass fiber composite tape. The addition of enhanced corona resistant tape insulation provides an insulation system which is electrically more enhanced than standard systems.

However, the magnitude and profile of the local electric field within the groundwall insulation has not been considered to date in the development of insulation systems and tapes for the groundwall. This electric field generated in the groundwall insulation as a result of the high voltage applied to the conductor has a direct effect on the insulation life. As various initiatives are in place to reduce the groundwall insulation thickness it should be understood that the effect of the electric field as it is distributed across the groundwall also has an effect on the performance of the insulation system and the life of the groundwall insulation system. Accordingly, there is a need to develop a groundwall insulation system for use in windings for dynamoelectric machines that takes into consideration the effects of the localized electric field generated in the groundwall insulation as a result of the voltage difference across the insulation.

SUMMARY OF THE INVENTION

In accordance with the present invention there is provided an insulation system for use in windings of dynamoelectric machines that results in a graded or sharp increase in the electric field as distributed through the insulation from the interior of the insulation adjacent the conductor bar or conducting elements to the outer armor or grounded armor of the insulation.

It should be understood that the term "graded increase" in the electric field relates a significant change in the electric field profile across a cross section of the groundwall insulation. In accordance with the present invention, the electric field profile across a "flat" cross section exhibits a sharp step increase part way across the cross section compared with a flat electrical field profile in the past. With respect to a corner section of the insulation, the electric field profile gradually decreases away from the conductors and again exhibits a sharp step increase part way across the corner cross section.

To accomplish the forgoing aspect of the graded change in the electric field profile of the insulation of the present invention, there is provided an insulation system that has a conductor of a dynamoelectric machine which is insulated with layers of insulation. The insulation has a first inner layer of insulation and a second layer of insulation outer relative to the first inner layer. Both the first and second layers of insulation have predetermined thickness so as to provide for the proper insulation characteristic needed for the insulation itself. However, the permittivity of the first inner insulation layer is chosen to be greater than that of the second insulation layer such that the electric field in the second insulation layer increases sharply at the juncture between the first inner and second layers of insulation.

It has been determined that by providing for a relatively higher permittivity on the inner layer, the electric field adjacent the conductor has a reduced magnitude. While the overall electric field distributed across the insulation may not be less, it should be understood that the magnitude of any sharp occurrences of the electric field in the insulating layer adjacent the conductor are reduced. This is a considerable undertaking because the insulation is designed and developed for its weakest areas in the insulation which occur at the corners of the insulation adjacent the conductors where the highest magnitudes of electric field have been experienced in the past. Thus by reducing this magnitude in electric field, the requirements for the thickness of the insulation is reduced thereby minimizing the thickness of the insulation while not adversely effecting the voltages carried by such conductors or the insulation life. It should be understood that in accordance with the present invention it is envisaged that these conductors carry voltages in the order of 4 kV and greater.

It is also envisaged that in alternative embodiments of the present invention the insulation may comprise more than two layers of insulation applied over each other in succeeding layers where each succeeding layer has a permittivity less than the preceding layer of insulation.

A preferred application of the insulation system of the present invention is as a groundwall insulation for conductors in the winding of a dynamoelectric machine carrying voltages of 4 kV and greater. In applications where the voltage is in the order of 13.8 kV, the thickness of the groundwall insulation is in the order of 3.2 mm.

In accordance with a preferred aspect of the present invention there is provided a groundwall insulation for use on a conductor of a dynamoelectric machine that has a graded electric field profile across the groundwall insulation. The groundwall insulation comprises a first inner insulation layer and a second outer insulation layer. The first inner insulation layer is applied over the conductor and has a first predetermined thickness and first predetermined permittivity. The second outer insulation layer is applied over the first inner insulation layer and forms a juncture therewith. The second outer insulation layer has a second predetermined thickness and second predetermined permittivity wherein the second predetermined permittivity is less than the first predetermined permittivity of the first inner insulation layer creating the graded increase in the electric field in the groundwall insulation at the juncture of the first inner and second outer insulation layers.

BRIEF DESCRIPTION OF THE DRAWINGS

For a better understanding of the nature and objects of the present invention reference may be had to the accompanying diagrammatic drawings in which.

DESCRIPTION OF THE PREFERRED EMBODIMENTS

Figure 1:
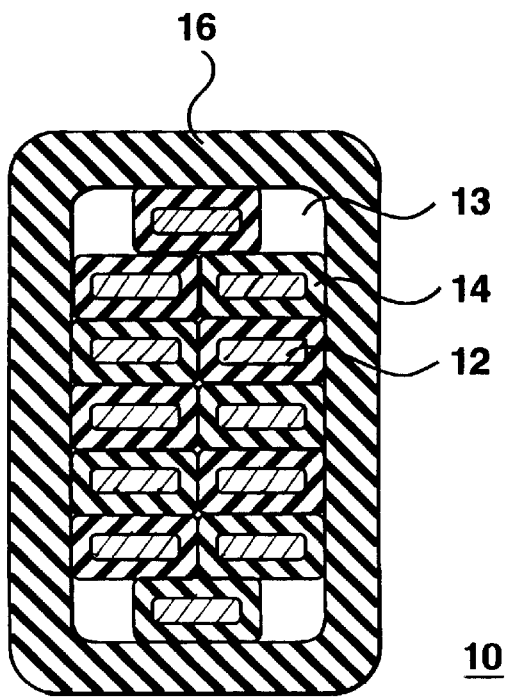
FIG. 1 shows the cross section of a typical stator bar for a large AC dynamoelectric machine.

FIG. 1 shows a cross section of a typical stator bar 10 for a large AC dynamoelectric machine. Bar 10 is composed of a large number of insulated conductors such as 12 which are insulated from each other by the strand insulation 14.

The conductors 12 are formed into a group after having strand insulation 14 applied thereto to provide the necessary isolation. The top and bottom surfaces of the conductor group are filled with an insulating material 13 generally referred to as a transposition filler. The group of insulated conductors 12 are next wrapped with a groundwall insulation material 16. The number of layers of insulating tape making up insulation may be from 7 to 16 layers of a mica tape insulation wound in half lap or wrapped fashion, depending on the level of operating voltage to which the conductors 12 are being subjected.

For high voltage applications, that is for voltages above 4000 volts and, preferably 13.8 kV, the preferred groundwall insulation 16 would be layers of a composite mica tape comprising a corona discharge resistant polyimide bonded to a mica type paper tape. This tape provides a good layer of insulation, and because of its corona resistant properties, provides long service life because of the resistance to corona discharge. The mica paper composites and tapes used in these hybrid systems contain a high percentage of a semi-cured resin (resin rich) which may or may not contain a corona resistant material. The wrapped bar is heated and compressed, in an autoclave or press, to allow the resin to temporarily liquefy so as to evacuate any entrapped air and eliminate any voids. Heat and pressure are maintained on the bar undergoing treatment so that the resin contained in the insulation is driven to gelation, bonding the insulation system together. The surface of the cured bar may next be coated with suitable materials to assure that the entire exposed surface of the bar will form an equipotential surface during machine operation.

The cured bar manufactured with the tape types as described above will function acceptably well within the design parameters of the machine for a predetermined period of time.

Figure 2:
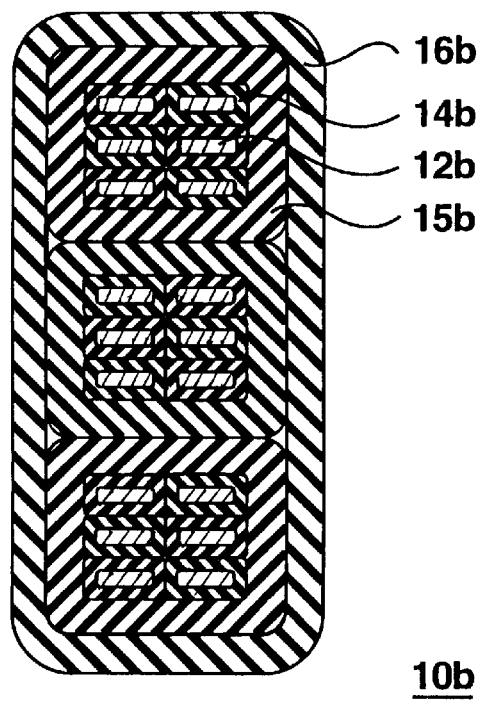
FIG. 2 shows the cross section of a typical stator coil for a large AC dynamoelectric machine.

FIG. 2 shows the cross section for a typical coil 10b. In this instance, strands 12b of copper (six shown) are grouped together so that although strands 12 are separated from each other by the presence of strand insulation 14b, the six strands grouped into the turn, must be insulated from the other turns of the coil 10b by means of turn insulation 15b. The turn package is ultimately covered with groundwall insulation 16b.

Figure 3A:
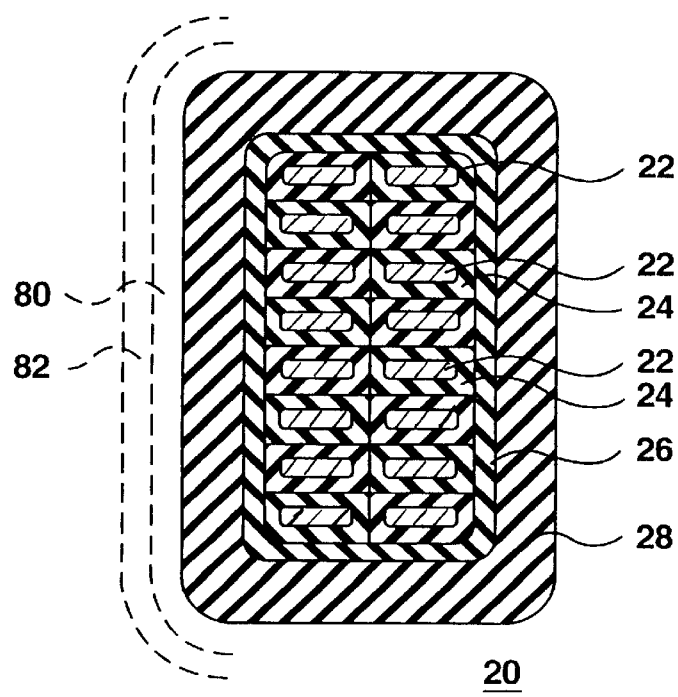
FIG. 3A shows an insulating system for the stator bar of FIG. 1 using the insulating system of this invention.

FIG. 3A shows the cross section of a stator bar insulated in accordance with the teachings of this invention. Here the conductor bundle is composed of individual conductors 22 separated by strand insulation 24 similar to that as previously shown in FIG. 1A. The conductor bundle is then wound with several layers of composite tape. Each layer of composite tape will comprise a first inner layer 26 of insulation tape and a second insulation layer 28 of tape. These layers 26, 28 of tape each have a predetermined thickness and different permittivities. In particular the permittivity of the first inner layer is greater then that of the permittivity of the outer most layer. It should also be understood that additional third or fourth layers of tape with reduced permittivity may be employed in the present invention.

It should be understood that these inner and outer insulation layers may comprise layers of half lapped tape composed of a composite such as mica paper backed on a glass tape backing to form layer 28. A suitable resin impregnant is present in the mica paper. This standard tape has an excellent voltage withstand capability.

The groundwall insulation comprising layers 26 and 28 may be subjected to press curing or an autoclaving curing process to eliminate any voids in the insulation layers 26 and 28 and to subsequently drive the resin impregnant to gelation.

Suitable surface coatings may be applied to the external surface of insulation layer 28 before or after cure.

Figure 3B:
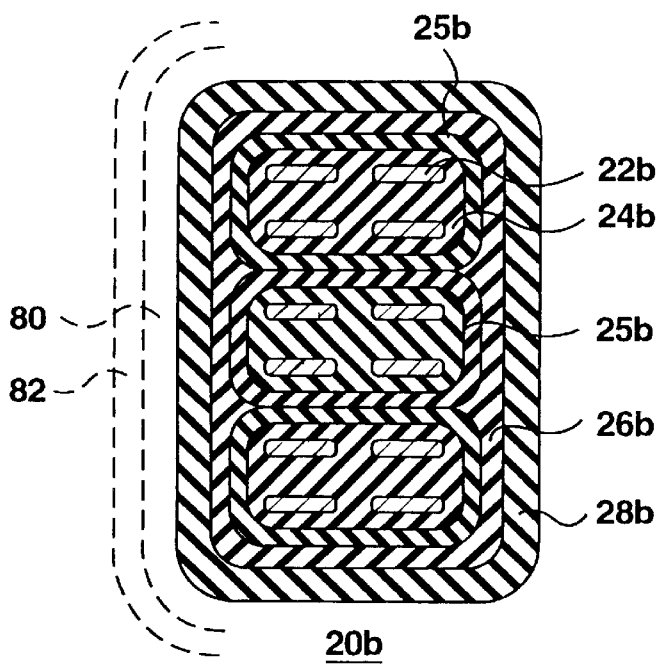
FIG. 3B shows an insulating system for a stator coil of FIG. 2 using the insulating system of this invention.

FIG. 3B shows the composite groundwall insulation as it applies to coil 20 composed of three turns. In this instance, the copper conductors 22b are surrounded by strand insulation 24b. The turn insulation 25b is applied to each turn and the initial layer of groundwall insulation 26b containing the same constituents as layer 26 in FIG. 3A is applied. Finally, the layer of outer groundwall insulation 28b is applied. With the exception of the presence of the turn insulation 25b, the insulation systems of FIGS. 3A and 3B are very similar.

Figure 4:
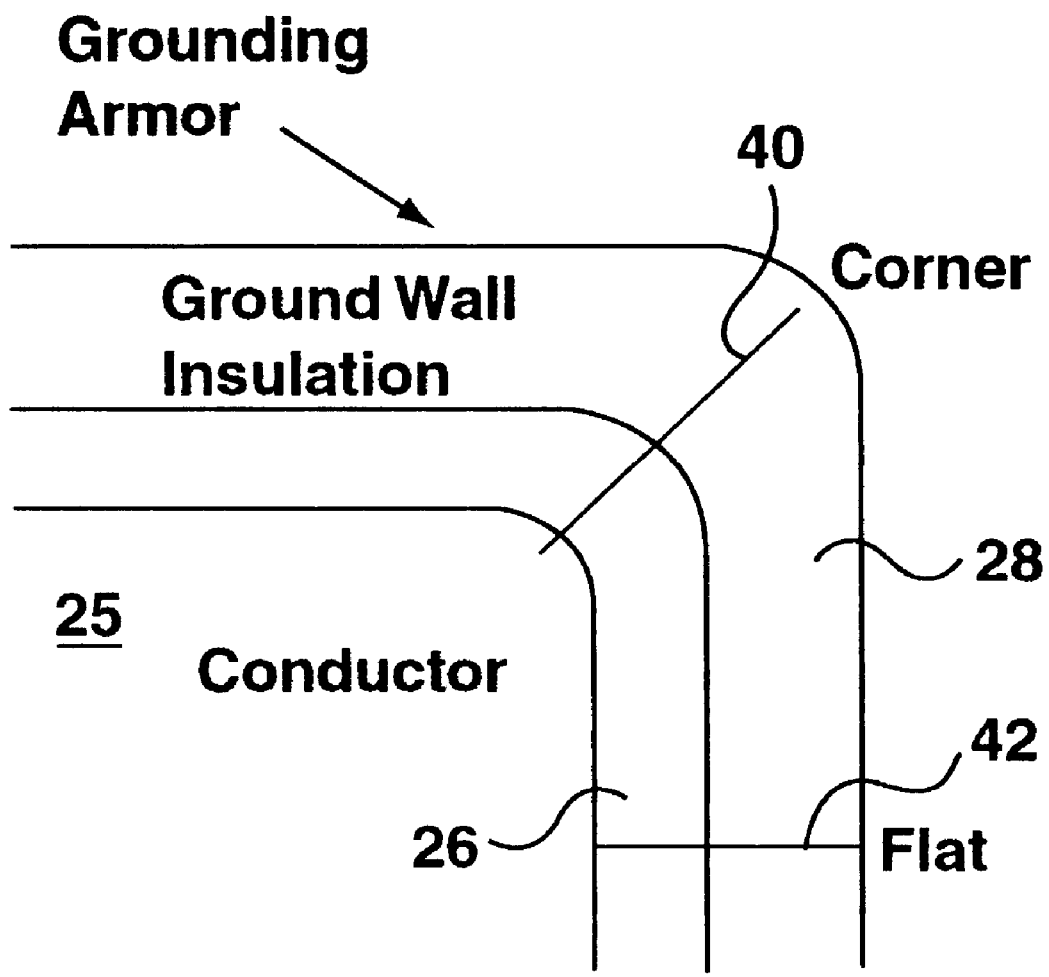
FIG. 4 is a simplified partial view of the conductor of FIG. 3A showing the location of the corner and flat cross-sections for the electric field profiles of FIG. 5.

Referring now to FIG. 4 there is shown a simplified drawing of the conductor 25 have including the inner insulation groundwall layer 26 and the second more outer insulation groundwall layer 28 also referred to as the first and second layers 26, 28. The first layer 26 has a permittivity which is chosen to be greater than that of the second layer 28. In testing that has been done, an inner layer of tape insulation 26 was utilized having a permittivity of 6.5. The permittivity of the second more outer insulating layer 28 was chosen to be 4.2. The predetermined thickness of the layers was 0.096 inches or slightly less then 2.5 mm. The electric field profiles were determined at the corner shown in 40 and the flat at 42. The result in measurement for FIG. 4 is shown in graph number for FIG. 6. However, before discussing the graph for FIG. 6, reference may be made to the graph for FIG. 5 which relates to the insulation shown in FIG. 1.

Figure 5:
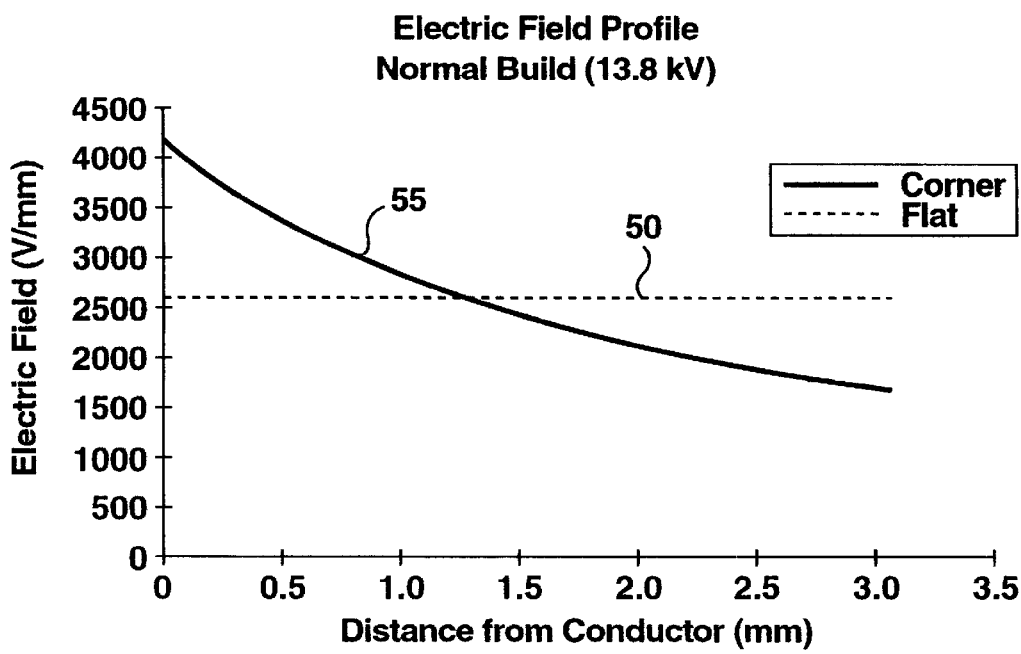
FIG. 5 is a graph of the electric field profile of the groundwall insulation of the stator bar of FIG. 1; and, FIG. 6 is a graph of the electric field profile of the groundwall insulation of the stator bar of FIGS. 3A and 4.

In FIG. 5, it is shown that the profile for the electrical field at the corner 40 diminishes in a curved slope fashion given by curve 55 starting at approximately 4200 volts per mm and this gradually decreases to the 3 mm in thickness for this conductor insulation material. On the flat, the potential electric field is stable at approximately 2600 volts per mm. This is shown by curve 50.

Figure 6:
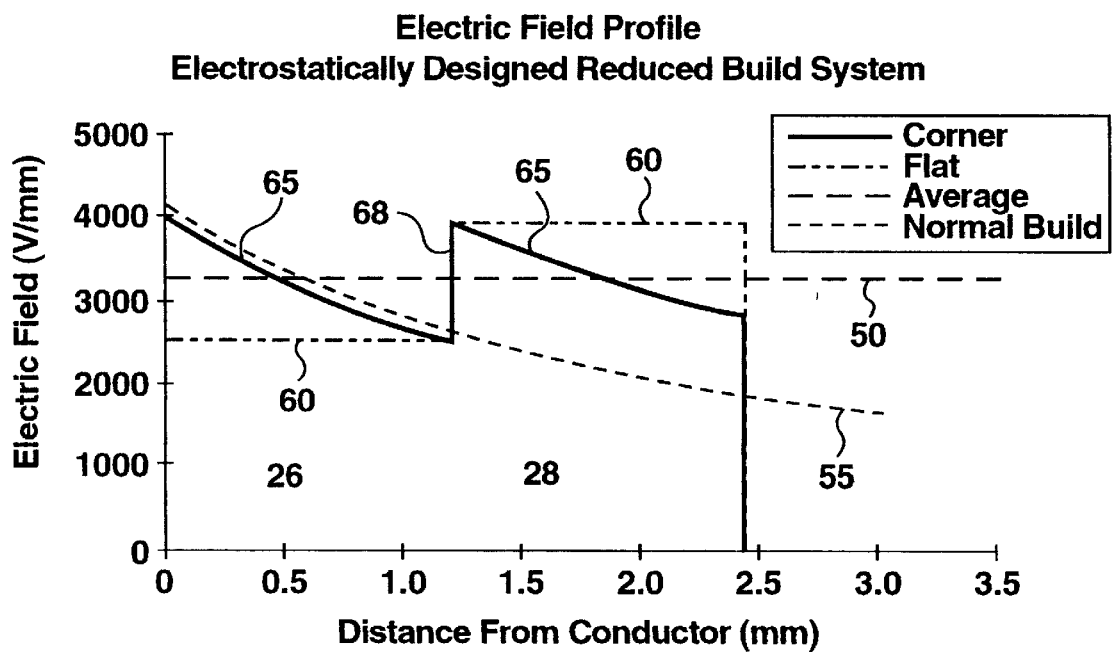

Accordingly, the insulation shown in FIG. 1 has its weakest portion at the corner adjacent to the conductor where the electric field is the greatest and hence the insulation has its weakest portion. Referring to FIG. 6, the graph is shown for the conductor as shown in FIG. 3A and is compared with the graph of FIG. 5 which is also provided on FIG. 6. The thickness of the two insulation systems 26 and 28 is shown. In graph 65 the maximum magnitude of the electric field is 4000 volts per mm as compared to about 4200 volts per mm in FIG. 5. However, the electric field profile decreases gradually along a curve until sharp step 68 where the second layer of insulation is formed at this juncture between layers 26 and 28. Thereafter the electric field diminishes again in a curved slopping manner. With respect to the electrical field profile across the flat 42, distribution layer, this is shown at 60 and can be compared to profile 50. Hence the distribution of the electric field adjacent the conductor is less for both the flat and curved portions 42 and 40 and has a sharp graded step increase at 68 and then is greater then that for curves 50 and 55 respectively. The present invention however does provide for a reduction in the maximum magnitude of the electric field that the groundwall insulation must withstand.

It should be understood that the electric field profile as shown in FIG. 6 is for a winding of stator bars and that this electric field profile would be present with a step type function across the juncture of the first and second layer of insulation for stator coils and this pattern can repeat with the addition of subsequent or successive layers of insulation having lower permittivities in each succeeding layer.

Further, it should be noted that the thickness of the insulation system used in FIG. 6 has been reduced significantly over that used in the prior art of FIG. 5. Hence this reduction in insulation results in material cost savings.

Referring again to FIGS. 3A and 3B, successive layers of insulation 80 and 82 are shown in ghost lines applied in succession over layer 28 in FIG. 3A and layer 28b in FIG. 3B. These successive layers 80, 82 if used, have declining permittivities for each layer applied further from the turn insulation 24 or groundwall insulation layers 26, 28.

It is further envisaged that the inner and outer layers of insulation utilized in the present invention may comprise two tapes made from different types of mica having differing permittivities dependent upon and inherent in the choice of mica for the mica paper tape. The mica papers chosen for these tapes would be such that the difference in permittivities inherent to the mica itself would contribute to an overall resultant permittivity of each tape. In this manner, multiple tapes of differing permittivities can be utilized based on a singe basic tape construction and chemisty. The most common form of mica is Muscovite that has a dielectric constant in the 6 to 8 range. Another form of mica is Phlogopite that has a dielectric constant in the 5 to 6 range. There are many different types of Mica pairings from which to select the advantageous pairing of materials. The mica may be chosen from the following: Anandite, Annite, Biotite, Bityte, Boromuscovite, Celadonite, Chemikhite, Clintonite, Ephesite, Ferriannite Glauconite, Hendricksite, Kinoshitalite, Lepidolite, Masutomilite, Muscovite, Nanpingite, Paragonite, Phlogopite, Polylithionite, Preiswerkite, Roscoelite, Siderophillite, Sodiumphlogopite, Taeniolite, Vermiculate, Wonesite, and Zinnwaldite.

It should be understood that alternative embodiments of the present invention may be readily apparent to a man skilled in the art in view of the above description for the preferred embodiments of this invention. For example, while the preferred embodiment relates to groundwall insulation, it is within the realm of the present invention that the turn insulation 24 of FIG. 3A surrounding conductor 22 may comprise the first inner layer of insulation and the second more outer layer may comprise the groundwall insulation layer 26 so long as the second layer 26 has a lower permittivity than the layer 24. Accordingly, the scope of the present invention should not be limited to the teachings of the preferred embodiments and should be limited to the scope of the claims that follow.

What is claimed is:

1. A winding element for use in a dynamoelectric machine surrounded by insulation, the insulation comprising:
   a first inner insulation layer applied over a conductor, the first inner insulation layer having a first predetermined thickness and first predetermined permittivity;
   a second insulation layer applied over the first inner insulation layer, the second insulation layer having a second predetermined thickness and second predetermined permittivity wherein the second predetermined permittivity is less than the first predetermined permittivity of the first inner insulation layer; and
   wherein the first inner and second insulation layers comprise mica paper tape where the mice chosen for each tape is a different type of mica.

2. The winding element of claim 1 wherein the first inner and second insulation layers each comprises several layers of either wrapped or lapped insulation tape.

3. The winding element as claimed in claim 2 wherein the first inner and second insulation layers comprise a corona discharge resistant material.

4. The winding element of claim 1 wherein the first insulation layer is a turn insulation layer applied to each conductor of a plurality of conductors, and the second layer of insulation is a groundwall insulation layer applied to the plurality of conductors over the first insulation layer.

5. The winding element as claimed in claim 4 further comprising at least one succeeding layer of insulation applied in succession over the second layer of insulation where each succeeding layer of insulation has a permittivity that is less than a previously applied layer of insulation.

6. The winding element as claimed in claim 1 further comprising at least one succeeding layer of insulation applied in succession over the second layer of insulation where each succeeding layer of insulation has a permittivity that is less than a previously applied layer of insulation.

7. The winding element as claimed in claim 1 wherein the different types of mica are chosen from the group consisting of Anandite, Annite, Biotite, Bityte, Boromuscovite, Celadonite, Chernikhite, Clintonite, Ephesite, Ferri-annite, Glauconite, Hendricksite, Kinoshitalite, Lepidolite, Masutomilite, Muscovite, Nanpingite, Paragonite, Phlogopite, Polylithionite, Preiswerkite, Roscoelite, Siderophillite, Sodiumphlogopite, Taeniolite, Vermiculate, Wonesite, and Zinnwaldite.

8. A groundwall insulation
   for use on a group of conductors forming a winding of a dynamoelectric machine having a graded electric field across the groundwall insulation, the groundwall insulation comprising:
   a first inner insulation layer applied over the conductor, the first inner insulation layer having a first predetermined thickness and first predetermined permittivity;
   a second insulation layer applied over the first inner insulation layer and forming a juncture therewith; the second insulation layer having a second predetermined thickness and second predetermined permittivity wherein the second predetermined permittivity is less than the first predetermined permittivity of the first inner insulation layer creating the graded increase in the electric field in the groundwall insulation at the juncture of the first inner and second insulation layers; and, wherein the first inner and second insulation layers are a mica paper tape where the mica chosen for each tape is a different type of mica.

9. The groundwill insulation of claim 8 wherein the first inner and second insulation layers of the groundwall insulation each comprises several layers of either wrapped or lapped insulating tape.

10. The groundwall insulation as claimed in claim 9 wherein the first inner and second insulation layers are impregnated with resin which contains particles of a corona discharge resistant material.

11. The groundwall insulation as claimed in claim 9 further comprising at least one succeeding layer of insulation applied in succession over the second layer of insulation where each succeeding layer of insulation has a permittivity that is less than a previously applied layer of insulation.

12. The groundwall insulation of claim 9 wherein the winding is adapted to carry voltages in excess of 4 kV.

13. The groundwall insulation of claim 12 wherein the winding is adapted to carry voltages of at least 13.8 kV.

14. The groundwall insulation of claim 9 wherein the thickness of the first and second layers of insulation is less than 3.2 mm.

15. The groundwall insulation as claimed in claim 8 wherein the different types of mica are chosen from the group consisting of Anandite, Annite, Biotite, Bityte, Boromuscovite, Celadonite, Chernikhite, Clintonite, Ephesite, Ferri-annite, Glauconite, Hendricksite, Kinoshitalite, Lepidolite, Masutomilite, Muscovite, Nanpingite, Paragonite, Phlogopite, Polylithionite, Preiswerkite, Roscoelite, Siderophillite, Sodiumphlogopite, Taeniolite, Vermiculate, Wonesite, and Zinnwaldite.

* * * * *

UNITED STATES PATENT AND TRADEMARK OFFICE
CERTIFICATE OF CORRECTION

PATENT NO. : 6,750,400 B2  Page 1 of 1
DATED : June 15, 2004
INVENTOR(S) : Younsi et al.

It is certified that error appears in the above-identified patent and that said Letters Patent is hereby corrected as shown below:

Column 6,
Line 24, "mice" should be -- mica --.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,750,400 B2
APPLICATION NO. : 09/942544
DATED : June 15, 2004
INVENTOR(S) : Younsi et al.

It is certified that error appears in the above-identified patent and that said Letters Patent is hereby corrected as shown below:

Column 7,
Line 11, "groundwill" should be -- groundwall --.

Signed and Sealed this

Twentieth Day of June, 2006

JON W. DUDAS
*Director of the United States Patent and Trademark Office*